Nov. 6, 1956  A. E. BECK  2,769,588
ORNAMENTAL BOX
Filed Sept. 15, 1952  7 Sheets-Sheet 1

INVENTOR.
ANITA E. BECK
BY Chas. C. Reif
ATTORNEY

Nov. 6, 1956    A. E. BECK    2,769,588
ORNAMENTAL BOX
Filed Sept. 15, 1952    7 Sheets-Sheet 2

INVENTOR.
ANITA E. BECK
BY Chas. E. Reif
ATTORNEY

Nov. 6, 1956
A. E. BECK
2,769,588
ORNAMENTAL BOX
Filed Sept. 15, 1952
7 Sheets-Sheet 3
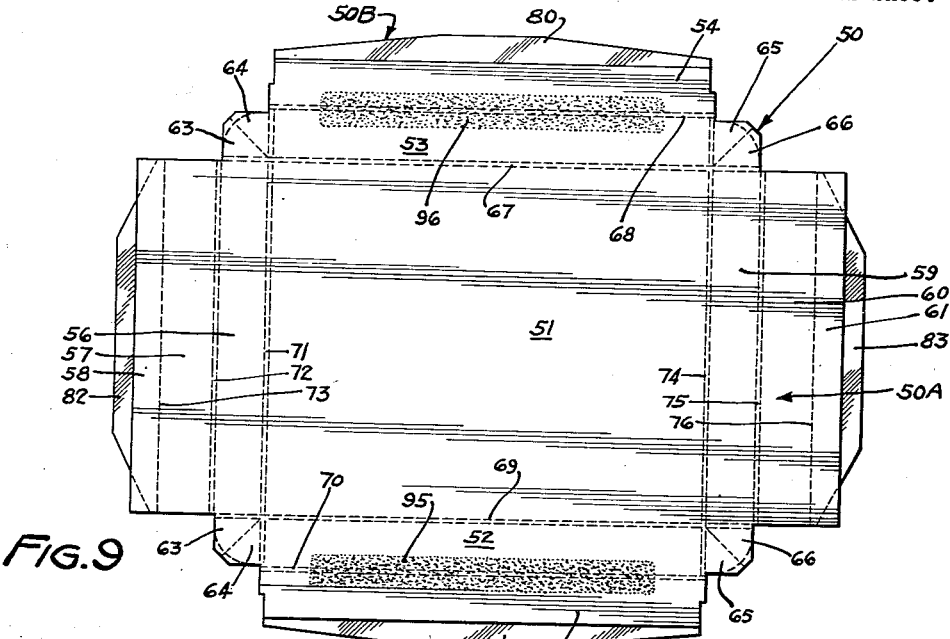
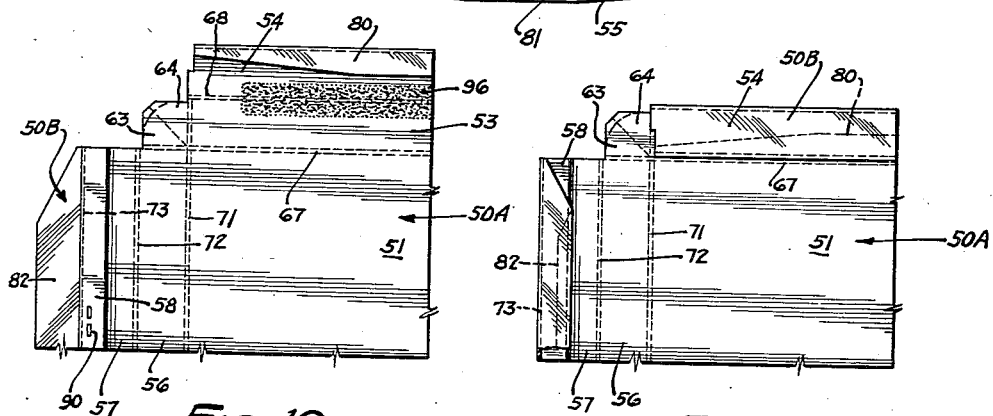
INVENTOR.
ANITA E. BECK
BY
Chas. C. Reif
ATTORNEY Nov. 6, 1956  A. E. BECK  2,769,588
ORNAMENTAL BOX
Filed Sept. 15, 1952  7 Sheets-Sheet 4
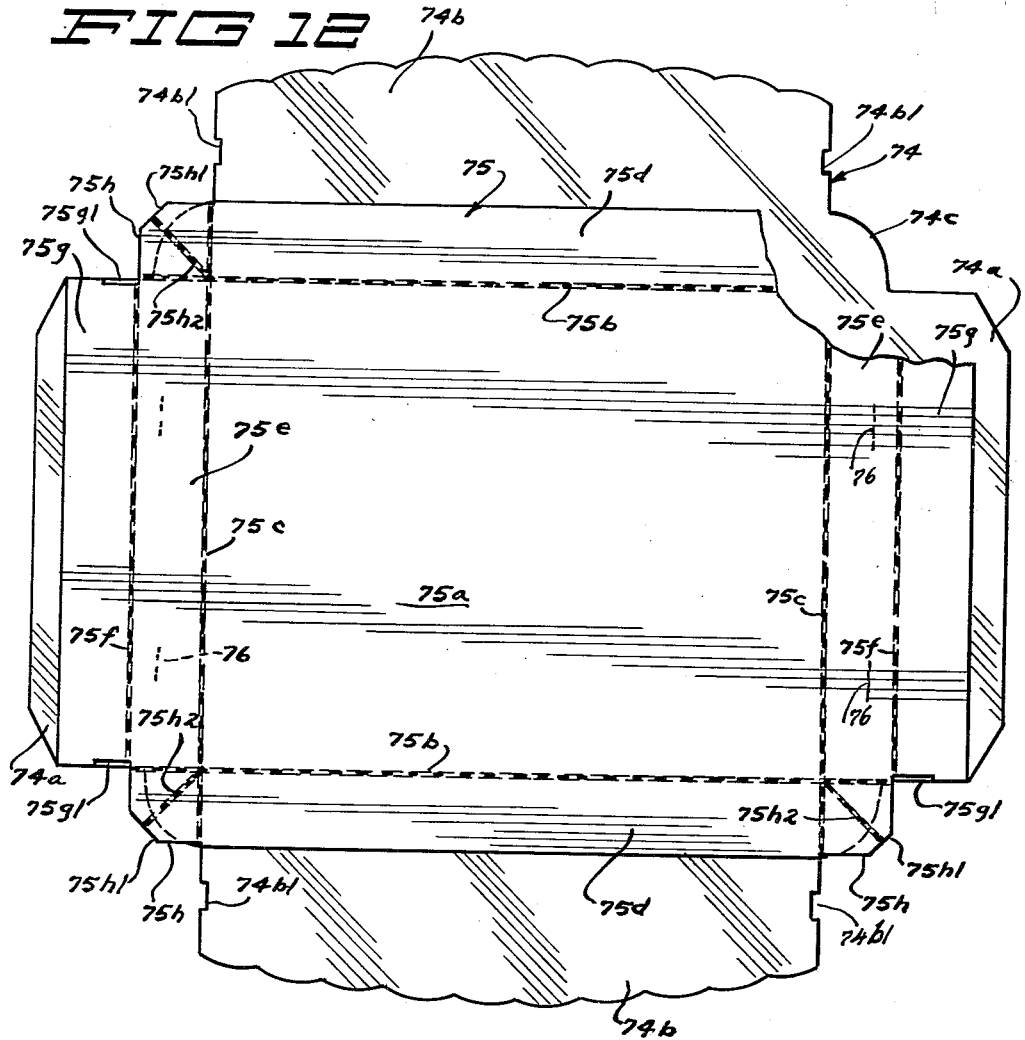
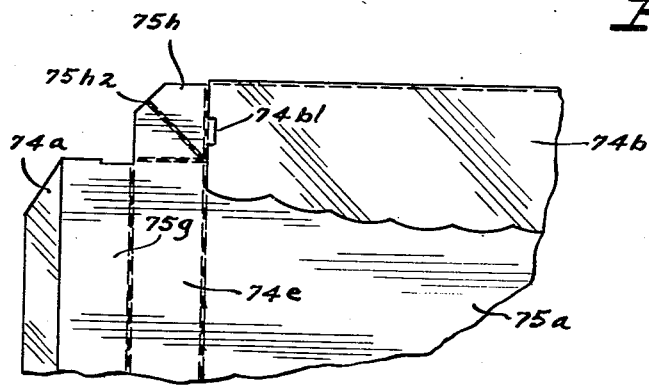
INVENTOR.
BY ANITA E. BECK
Chas. C. Reif
ATTORNEY Nov. 6, 1956  A. E. BECK  2,769,588
ORNAMENTAL BOX
Filed Sept. 15, 1952  7 Sheets-Sheet 5
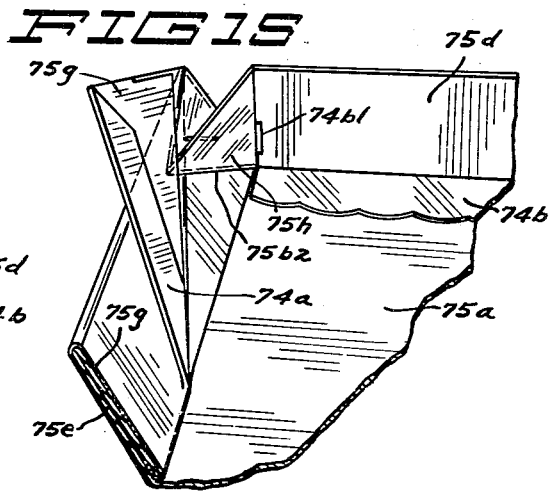
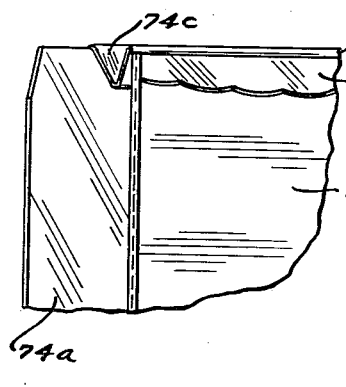
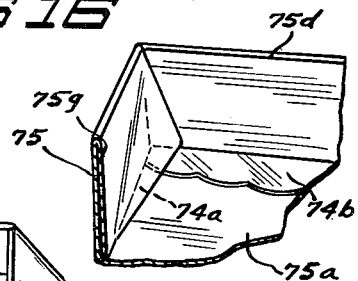
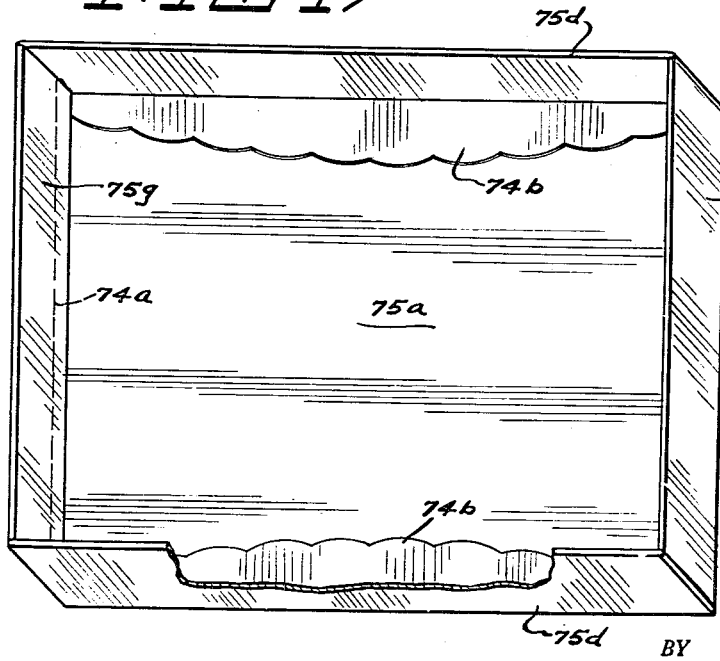
INVENTOR.
ANITA E. BECK
BY
*Chas. C. Reif*
ATTORNEY

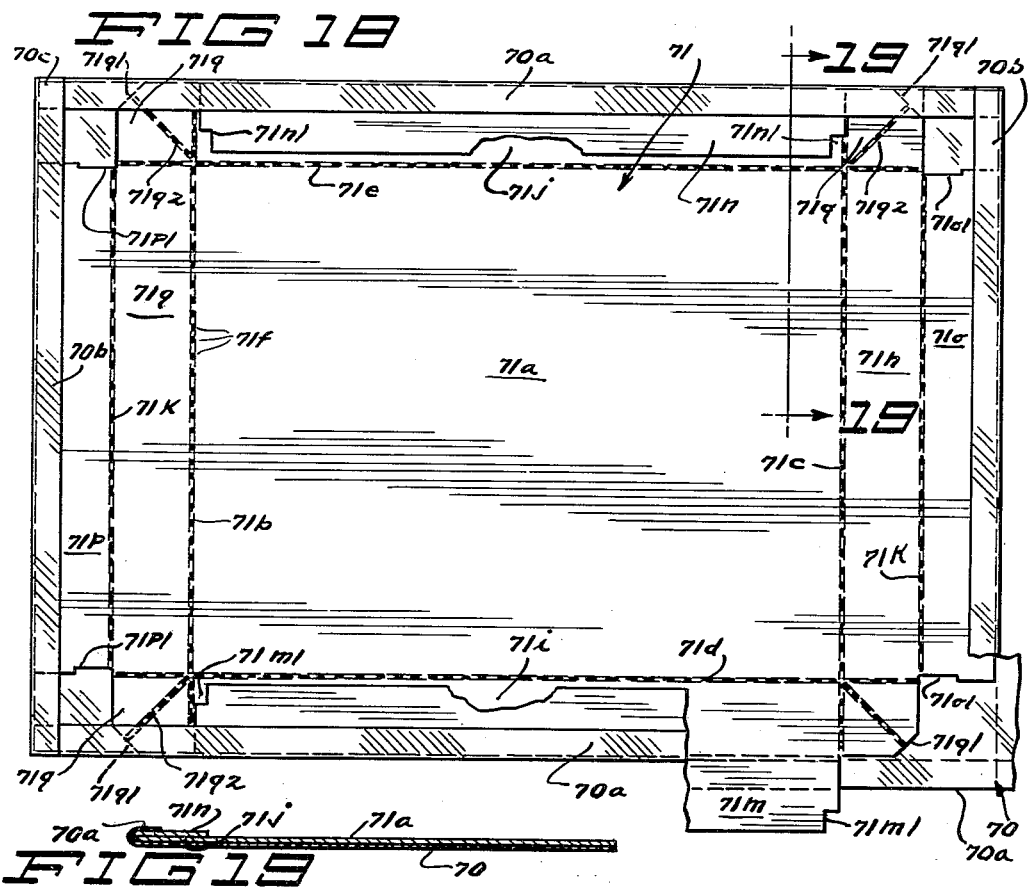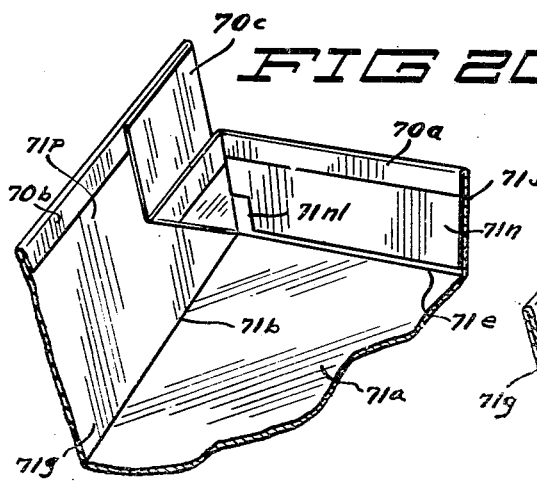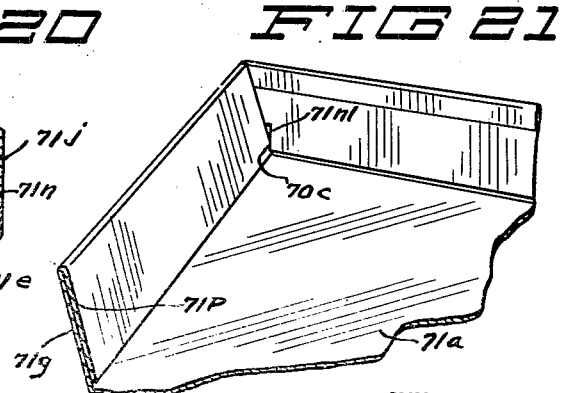

Nov. 6, 1956 A. E. BECK 2,769,588
ORNAMENTAL BOX
Filed Sept. 15, 1952 7 Sheets-Sheet 7
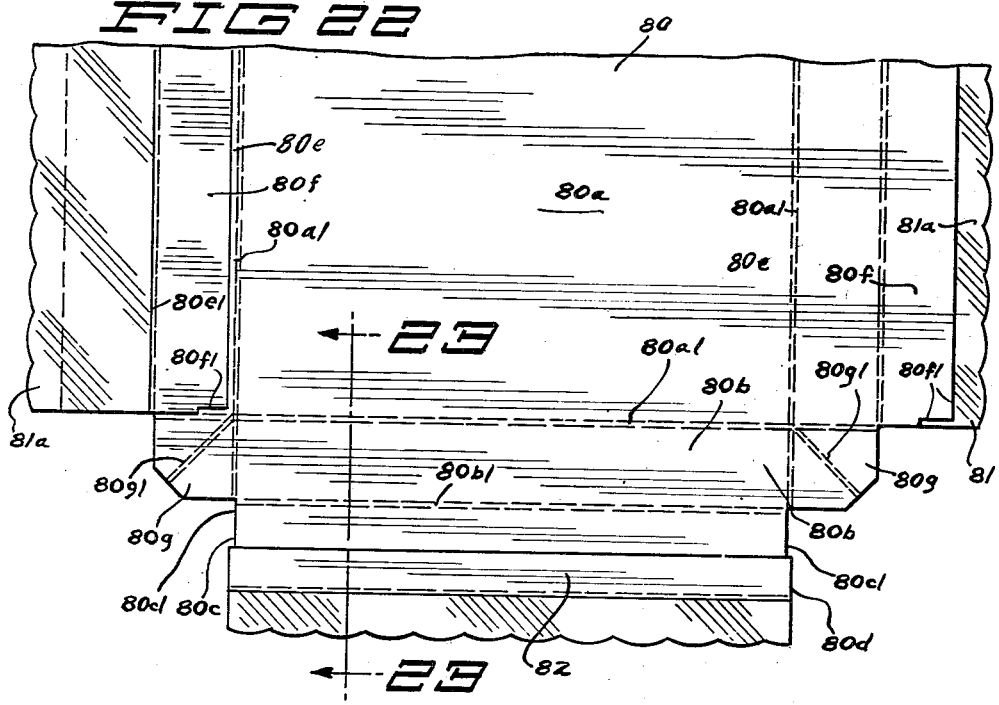
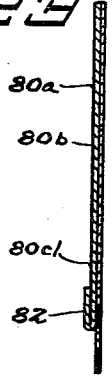
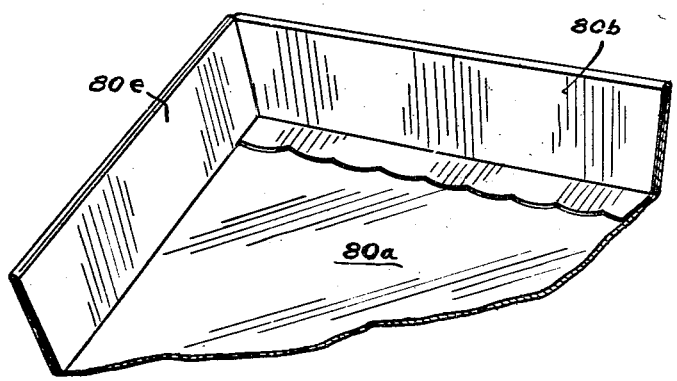
INVENTOR.
ANITA E. BECK

United States Patent Office 2,769,588
Patented Nov. 6, 1956

2,769,588

ORNAMENTAL BOX

Anita E. Beck, Minneapolis, Minn.

Application September 15, 1952, Serial No. 309,690

3 Claims. (Cl. 229—31)

This invention relates to new and useful improvements in cardboard boxes within which articles of merchandise are placed on sale and specifically relates to new and useful improvements in a cardboard box having loose ornamental wrapping affixed thereto.

In the sale of articles of merchandise which are purchased by the consumer at haberdasheries, drygoods stores, variety stores, department stores and the like, there has long existed a problem of wrapping merchandise speedily and attractively even without experience in wrapping. There has also existed the problem that each counter or division of a store must be supplied with its own wrapping materials which are usually custom fitted to a particular box. Thus, the inexperienced clerk in a store has oftentimes produced a poorly wrapped package which is not acceptable to the customer. Furthermore, time is consumed in placing the article of merchandise in a box, closing the box, wrapping paper thereabout and tying a string or securing adhesive tape thereon to hold it in place. While the wrapping service furnished by stores, particularly gift wrapping services, is onerous and costly and provided with the foregoing drawbacks, it is a service which must be provided by the store for the benefit of its customers and one which usually must be provided free of charge.

It is therefore an object of the present invention to provide a wrapping unit comprising a box and loose wrapped paper attached thereto.

It is a further object of such invention to provide a supply of flat folded box blanks with loose fitting paper attached thereto whereby storage and shipping of boxes and wrapping paper is greatly facilitated.

It is a further object of this invention to provide a flat folded box blank having an ornamental covering attached only at the edges thereto, said blank being pre-cut and pre-formed for easy assembly.

Another object of the present invention is to provide a box wrap which is of simple, practical construction, which is neat and attractive in appearance and inexpensive to mnaufacture, ship, store and otherwise well adapted for the purpose of wrapping articles.

It is still another object of this invention to provide a telescoping box for merchandise with a covering affixed only at the edges thereof so as to provide the appearance of a custom loose wrapped box.

Still further objects of this invention reside in the manner of attaching the loose covering at the edge thereof to the box blank and the constructional details thereof.

Other objects of the invention are those inherent and apparent in the article as described, pictured and claimed.

The article will be described with reference to the drawings in which corresponding numerals refer to the same parts and in which:

Fig. 9 is a view similar to Fig. 1 but showing a slightly modified form of the blank;

Fig. 10 is a view similar to Fig. 9 showing the second stage of construction of the formation of the finished blank of the modified form of Fig. 9;

Fig. 11 is a view similar to Fig. 10 but showing a third stage of the formation of the blank of Fig. 9;

Fig. 12 is a plan view of the blanks of a modified form of box;

Fig. 13 is a partial view similar to Fig. 12 illustrating an initial step in the method of folding the box;

Fig. 14 is a partial perspective view of the uncompleted box;

Fig. 15 is a perspective view of the box when more nearly completed;

Fig. 16 is a partial perspective view showing one of the final steps in the method of folding the box;

Fig. 17 is a perspective view of the completed box, a portion being broken away;

Fig. 18 is a plan view of the parts of a modified form of box, the same parts being folded;

Fig. 19 is a vertical section taken on line 19—19 of Fig. 18 as indicated by the arrows;

Fig. 20 is a partial perspective view of the partially completed box;

Fig. 21 is a partial perspective view of the completed box;

Fig. 22 is a partial plan view of a further modified form of box, some parts being already folded;

Fig. 23 is a vertical section taken on line 23—23 of Fig. 22 as indicated by the arrows; and Fig. 24 is a partial perspective view of the completed box.

Figure 1:
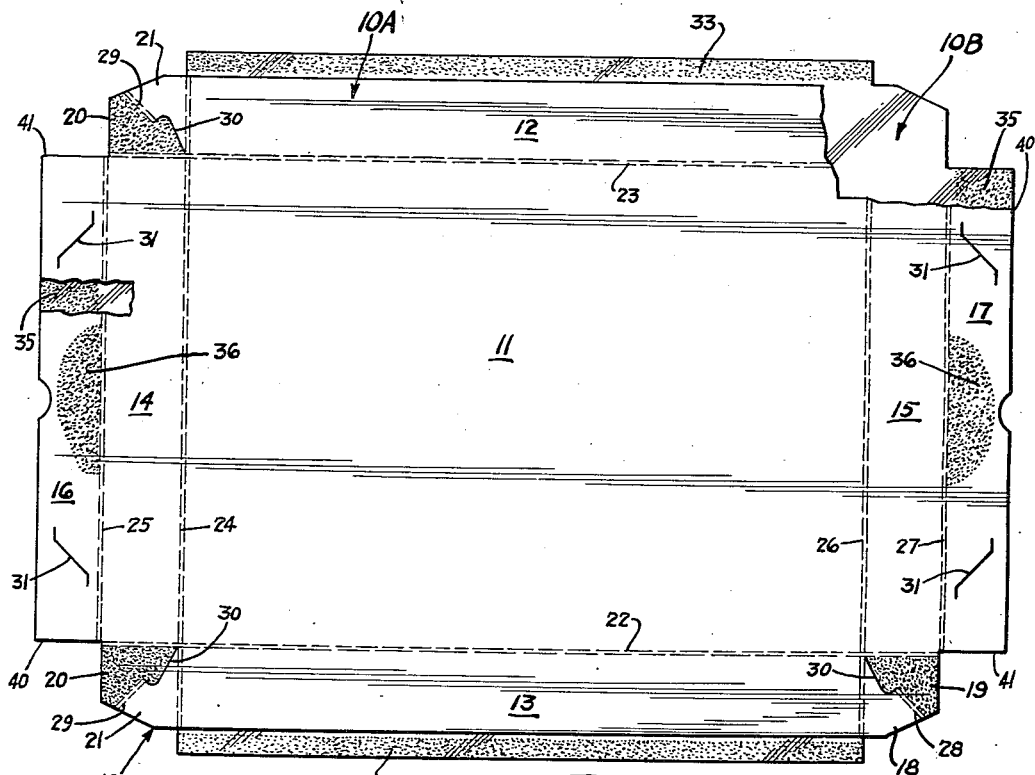
Fig. 1 is a top plan view of one of a cooperating pair of telescoping box blanks of the instant invention, being partially broken away to show the details thereof, and showing a first step in the preparation of the assembled blank which is shipped to the customer.

Referring to Fig. 1, there is shown a composite blank generally designated 10 comprised of a stiffener 10A and a planar sheet 10B disposed thereunder in Fig. 1. Stiffener 10A has a rectangular panel 11 which will be either the top or bottom panel of the finished box depending on whether the blank is to be used for the top half of a telescoping box or for the bottom half of a telescoping box. With reference to this specification, it will be understood that the two halves of the telescoping box are identical with the bottom half being slightly smaller than the top half so as to fit therein in the conventional manner. Throughout the specification, the blank will be described with reference to the top half of a box but it is to be understood that this will likewise apply to the bottom half of a box, as the construction is identical. Hence there will be provided a stiffening blank 10A covered loosely by a planar sheet 10B which forms either the top or the bottom of a loose wrapped box. Since a telescoping box of itself forms no part of the present invention, it will not be described in greater detail. Thus, the top face panel 11 is bounded by side panels 12 and 13 and end panels 14 and 15. Each end panel 14 and 15 is provided with an extension panel or retaining portion 16 and 17, as shown in Fig. 1.

Each end of the panel 14 is joined to side panels 12 and 13 by gores 20 and 21, and each end of the panel 15 is joined to side panels 12 and 13 by gores 18 and 19. Gores 19 and 20 are provided with adhesive, as shown in Fig. 1.

The blank of Fig. 1 is provided with score lines 22 and 23 parallel to the major edges thereof and score lines 24, 25, 26 and 27 parallel to the minor edges thereof. Score line 28 is provided between bores 18 and 19 and line 29 between gores 20 and 21. Cut lines 30 join lines 29 and 28 and serve to separate gores 20 from 21 and 18 from 19. A pair of Z-shaped cut lines 31 is provided in each one of the end extensions 16 and 17 to allow the corners thereof to be bent for the purposes explained more fully hereinafter.

The planar sheet 10B, usually of ornamental paper, of the configuration shown best in Fig. 1 is disposed beneath the stiffening blank 10A. The paper 10B extends beyond panels 12 and 13 at 33 and 34, and is adhered to extensions 16 and 17 throughout its length, as indicated at 35.

Figure 2:
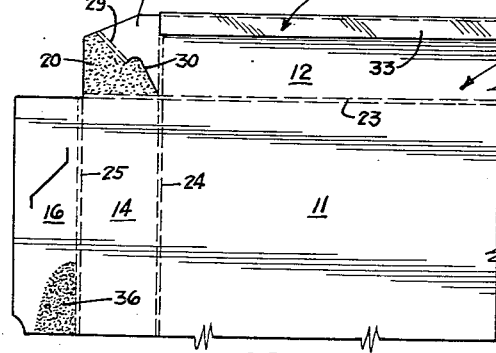
Fig. 2 is an enlarged view of a corner of the blank of Fig. 1 and showing a second step in the preparation of the assembled blank which is shipped to the customer.
Figure 4:
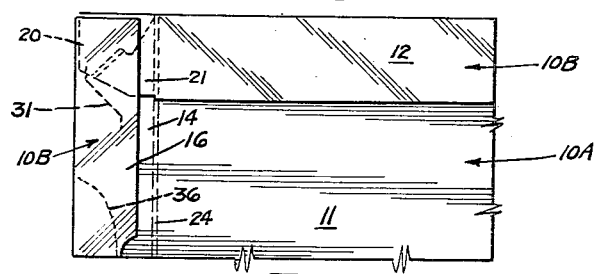
Fig. 4 is a view similar to Figs. 2 and 3 but showing the form of the assembled blank as it is shipped to the customer.

Disposed in the center of extensions 16 and 17 is a semicircular patch of adhesive 36 which serves to hold extension 16 to panel 14 and extension 17 to panel 15 when the extensions 16 and 17 are folded inwardly from the position of Fig. 1 to the position shown best in Fig. 4 for extension 16. The extending portions 33 and 34 of the planar sheet 10B are also covered with adhesive, as is indicated in Fig. 1. Thus, with reference to Fig. 2, extending portion 33 is folded over panel 12 and extending portion 34 is folded over panel 13 to secure the paper 10B to the stiffener 10A. Thus, the paper 10B will be secured to the stiffener 10A only along portions 33 and 34, and by the adhesive 35 securing the paper 10B to extensions 16 and 17.

Figure 3:
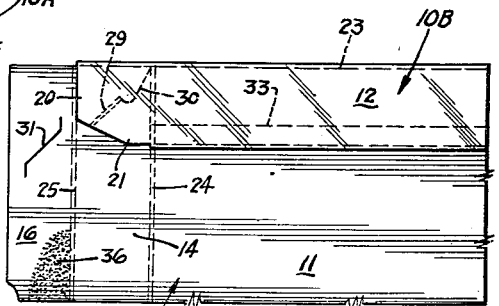
Fig. 3 is a view similar to Fig. 2 but showing a third step in the preparation of the assembled blank.

To prepare the panel in its preassembled form for shipment, panels 12 and 13 are folded inwardly as shown for panel 12 in Fig. 3. Panel extensions 16 and 17 are then folded inwardly over panels 14 and 15 as shown for extensions 16 and panel 14 in Fig. 4, and the extensions 16 and 17 are secured to panels 14 and 15 respectively by the adhesive areas 36. Thus, with reference to Fig. 4, the extension 16 will be secured to panel 14 throughout the adhesive area 36 but the edges thereof will be free and may be bent upwardly. This freedom of upward bending is aided by the Z-shaped cuts 31.

When the panels 12 and 13 have been folded inwardly, as in Fig. 3, the adhesive on gores 19 and 20 has adhered to panels 14 and 15 and thus when the blank is in the position of Fig. 4 in addition to extension 16 being secured to panel 14 by adhesive areas 36 gores 20 are secured to panel 14 and gores 19 are secured to panel 15 by the adhesive thereon. At this time gores 21 and 18 are in abutment but not secured to panels 14 and 15. The box is then shipped to the consumer in the position shown in Fig. 4.

Figure 6:
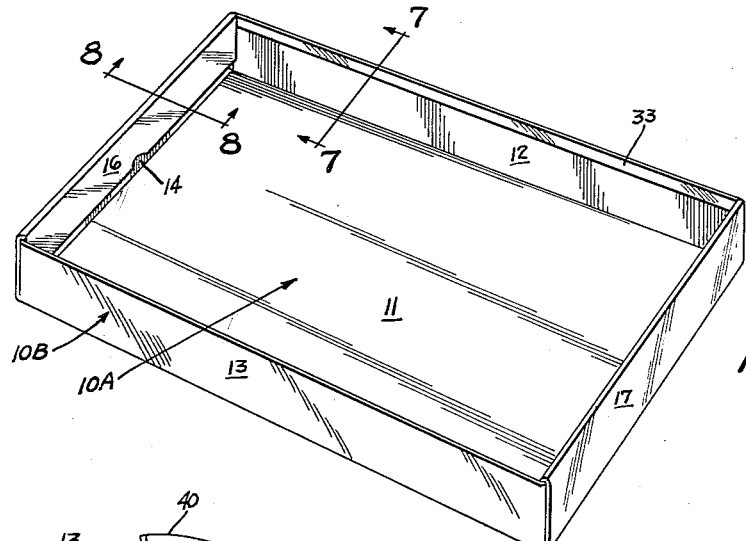
Fig. 6 is a view of the blank of Fig. 1 in erected position.
Figure 5:
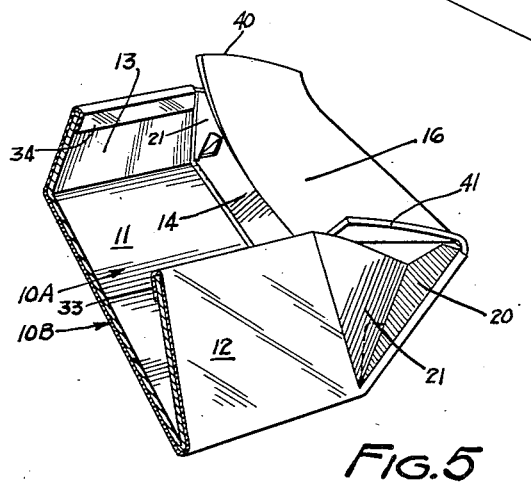
Fig. 5 is a perspective view of one end of the blank of Figs. 1–4 showing the end in partially erected position.

When it is desired to form the completed telescoping box half as shown in Fig. 6, the panels 12 and 13 are grasped at the inner edges thereof and pulled outwardly. Since gores 20 and 19 are now connected to panels 14 and 15 and gores 21 and 18 are not secured the box will assume the position of Fig. 5 on its way to erected position. Thus, as shown in Fig. 5, the panels 12 and 13 have been pulled outwardly and are partially erected. The outward force transmitted to panels 12 and 13 have pulled gores 21 and 18 from abutment with panels 14 and 15 to a diagonal position and have pulled panels 14 and 15 into an inclined position as shown with reference to panel 14 in Fig. 5. The elevation of gores 18 and 21 to the diagonal position shown in Fig. 5 will cause ends 41 and 40 of panel extensions 16 and 17 to be bent upwardly along the Z-cuts 31, as shown in Fig. 5 for extension 17 and ends 40.

Figure 7:
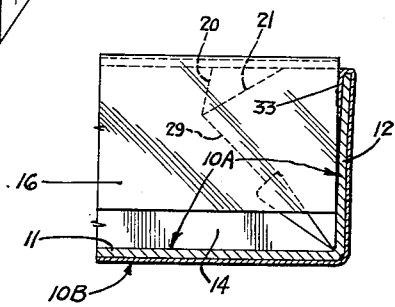
Fig. 7 is a vertical sectional view taken along the lines and in the direction of the arrows 7—7 of Fig. 6.

Further outward pressure on panels 12 and 13 will cause them to assume a vertical position and will cause free gores 21 to abut against attached gores 20, as shown in dotted lines in Fig. 7. The abutment of free gores 21 against attached gores 20 will be maintained by the resiliency of ends 40 which assume the position shown in Fig. 6. A similar situation exists with reference to gores 18 and ends 41 of extension 16.

Figure 8:
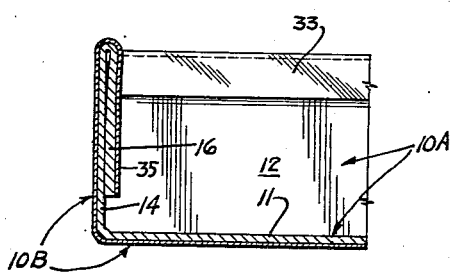
Fig. 8 is a view taken along the lines 8—8 of Fig. 6.

Also when the telescoping section is erected, as shown in Fig. 8, it provides one-half of a complete box for merchandise having a wrapping secured only on the inside of said telescoping section, thus giving the appearance of a custom loose-wrapped box. Two of these sections may be used to form the top and bottom of a telescoping box which will give the appearance of being loose-wrapped throughout or if it is desired this section may be used as the top section of the telescoping box in which the bottom section is not loose-wrapped. This, while more economical, does not provide the finished appearance of the box when the bottom section is similarly loose-wrapped, as does the preferred embodiment of this invention.

Referring now to Figs. 9–11, there is shown a composite blank generally designated 50 similar to the blank of Fig. 1 having a stiffener 50A and a planar covering sheet 50B. Stiffener 50A has a rectangular panel 51 and side panels 52 and 53. Side panel 53 is provided with an extension panel 54 and side panel 52 is provided with an extension panel 55. Integral with panels 51–53 are end panels 56 provided with extension panels 57 and 58 and end panel 59 provided with extension panels 60 and 61. Panels 56 and 59 are joined to panels 53 and 52 by gores 63 and 64 and 65 and 66 respectively. Longitudinal score lines 67, 68, 69 and 70 and transverse score lines 71, 72, 73, 74, 75 and 76 are provided, as shown the best in Fig. 9. Disposed beneath the blank 50 is a covering sheet 50B having longitudinal extensions 80 and 81 and transverse extensions 82 and 83. At the juncture of panels 52 and 55 and 53 and 54 is provided a layer of cohesive 95 and 96, so that when panel 55 is folded against panel 52 and panel 54 against panel 53 the panels will adhere throughout the length of the cohesive.

Thus, as may be seen best with reference to Fig. 10, sheet extensions 80 and 81 are folded over panels 54 and 55 as shown for panel 54 in Fig. 10, and stiffener extensions 58 and 61 are folded over panels 57 and 60 as shown for panel 57 in Fig. 10.

Panels 54 and 55 with extensions 80 and 81 folded thereover are then folded into abutment with panels 53 and 52 so that the cohesive areas 95 and 96 contact as shown best in Fig. 11. Extensions 58 and 61, after they have been folded into abutment with panels 57 and 60, are stapled thereto as shown by staple 90 for panel 57 in Fig. 10. The paper extensions 82 and 83 are then tucked thereunder as shown best in Fig. 11.

It is to be understood at this time that the staple and tuck method of forming the ends of the modification of Fig. 9 or the tuck and cohesion method of forming the sides of the modification of Fig. 9 may be interchanged or substituted for one another without departing from the spirit and scope of this invention. After the modified blank shown in Figs. 9–11 has assumed the position of Fig. 11, it is further folded in exactly the manner of blank 1 through stages similar to Figs. 2, 3 and 4 and is then erected as is shown in Figs. 5, 7 and 8 to the position of Fig. 6. Thus the blank of Fig. 11 is treated exactly as the blank of Fig. 2 and will operate in the same manner except that the Z-shaped apertures 31 of blank 10 are omitted and except that the gores 63 and 65, similar to gores 20 and 19 are not adhesively affixed in the modification shown in Figs. 9–11, nor are the end panels 57 and 60, similar to extensions 16 and 17 of Fig. 1, secured to their adjacent panels 56 and 59.

Thus the modification of Figs. 9–11 is erected in the same manner as the modification shown in Figs. 1–8 with the exception that it is not self-erecting as is the modification shown in Figs. 1–8, and consequently panels 54 and 55 when extended do not determine the erected position of the gores and panels 57 and 60. The panels 54 and 55 must be elevated to vertical position, gores 63 brought into abutment with panel 56, and gores 66 brought into abutment with panel 59 and panel 60 folded downward over panel 59 and panel 57 folded downward over panel 56 whereby the gores are maintained in abutment by the frictional engagement of the edges of panels 60 and 57 with the edges of panels 55 and 54.

In Figs. 12 to 17 another form of the box is shown. Referring to Fig. 12, a cover blank 74 is shown on which is superposed the box or stiffener blank 75. The blank 75 has a central panel 75a which is defined by the score lines 75b at the sides thereof and the score lines 75c at the ends thereof. The blank 75 also has the side panels 75d defined on their long sides by the lines 75b and the outer side edge of the blank 75. Said panels 75d are defined at their shorter end sides by the lines 75c. Blank 75a has end panels 75e extending from the central panel 75a, the same being defined at their long sides by the score lines 75c and the score lines 75f parallel thereto. Said panels 75e at their short or end sides are defined by the lines 75b. Blank 75 also has terminal end panels 75g extending from panels 75e, the same being defined on their long sides by the lines 75f and the outer end edges of blank 75. Said panels 75g are defined at their short sides or ends by the outer edges of blank 75. Between the ends of the panels 75e and 75d are the zones 75h. These zones are rectangular and substantially square except that the outer corners thereof cut off along the lines 75h1. Said zones are provided with score lines 75h2 which extend from their inner corners outwardly diagonally to lines 75h1. The score lines 75b, 75c and 75h2 are also preferably provided with perforations. The zones 75g are cut away to form right angled recesses 75g1 at the inner portion of their ends. It will be noted that the cover blank 74 extends beyond the sides and ends of the box or stiffener blank 75 and has end panels 74a at the outer sides of panels 75g, said panels 74a having their ends somewhat beveled as shown. Cover blank 74 also has the side panels 74b extending outwardly from the panel 74b. Said panels 74b are shown with scalloped outer edges and are provided with rectangular recesses 74b1 at their ends. Said cover panel also has zones 74c having curved outer edges which underlie the zones 75b.

In the first operation, the panels 74b are folded inwardly to overlie the panels 75d of the box and a portion of the central or bottom panels 75a. The side panels 75d are then folded upwardly to vertical position. In the next step the panels 75g are folded over on panels 75e along the lines 75f. Panels 75g are secured at spaced points adjacent the center thereof by any suitable means such as staples 76 which will be located substantially as indicated in Fig. 12. Zones 75h are now folded inwardly along lines 75h2 and the side panels 75d with the overlying cover moved to vertical position. The portions 74b of the cover extending beyond zones 75d now overlie the bottom or central panel 75a and are in contact therewith as shown in Fig. 17. The end portions of the blank 74 are now folded inwardly and the panels 74a thereof will extend for some distance beyond the folded over and stapled panels 75g. The panels 75e with the panels 75g secured thereto will now be moved to vertical position and folded inwardly over the folded zone portion 75h, as indicated in Fig. 15. One-half of the folded zone portion 75h which is adjacent the end panel is preferably stapled to said end portion, as shown in Fig. 15, before the cover is folded over the end panels. It will be seen that the inner edge portion of panel 75g is free and the end panels 74a of the cover are folded under this free portion, as shown in Fig. 17. The box now is in completed condition and appears as shown in Fig. 17. The bottom ends of the folded over end panels 75g push into the recess 75g1 and 75b1 and this holds the ends of the box nicely in vertical position. The important feature of the box shown in Figs. 12 to 17 is that no gluing is necessary to hold the various panels in final position. A wrapped box is produced which can be very quickly made. As in the over forms, the cover is loose at the outer sides of the box and the box has all the appearance of a hand wrapped gift box.

In Figs. 18 to 21 another form of box is shown which comprises a cover blank 70 of rectangular form, as shown in Fig. 1, and a stiffener or box blank 71 is shown superposed on the blank 70. Blank 71 has a central panel 71a defined by the score lines 71b and 71c at the ends of said panels respectively and the score lines 71d and 71e at the sides of said panels respectively. In addition to the score lines 71b, 71c, 71d and 71e perforations 71f are also made along said score lines. At the outer sides of the central panel 71a are end panels 71g and 71h at the ends thereof and panels 71i and 71j at the sides thereof. Panels 71g are defined at their short sides or ends by the score lines 71e and 71d, and at their long sides by the score lines 71b with the perforations 71f at one side and the score lines 71k at the opposite sides. The lines 71k are also provided with perforations. Said member 71 also has outer panels 71m and 71n at the opposite sides thereof and end panels 71o and 71p at the ends thereof. The panels 71m have right angled cut away portions 71m1 at their outer corners and the panels 71n have similar cut away right angled portions 71n1 at their outer corners. The end panels 71o and 71p also have narrow right angled cut away portions 71o1 and 71p1 at their inner end portions adjacent the panels 71g and 71h respectively. Zones 71q are disposed in the corners between the end panels 71g and 71h and between the side panels 71i and 71j. These zones are substantially square in plan but have one outer corner portion cut away as indicated by the line 71q1. The zones are provided with score lines 71q2 which extend diagonally from their inner corners to the line 71q1. The lines 71q2 are also provided with perforations.

In forming the box the zones 71m and 71n are folded inwardly and down onto the zones 71i and 71j respectively and are secured in this position by any suitable means, such as being glued to said panels 71i and 71j. In the next step the side portions 70a of the cover which extend beyond the side panels 71n and 71j are folded inwardly onto the top of said panels 71i and 71j, which as stated, have already been folded inwardly and secured. In the third step the end portions of the cover 70b which extend beyond the end panels 71o and 71p are now folded inwardly onto the panels 71o and 71p. The cover panels 71a are firmly secured to the folded over panels 71m and 71n in any suitable manner as by gluing and these portions 70a are also folded over the zone portion 71q and upon the cover itself beyond the zones 71q. The portions 70b are firmly secured to the end panels 71o and 71p and also to the portion of the cover itself at the ends of said zones as well as onto the tops of the folded over portions 71a. This is the condition of the box as seen in Fig. 18. In the next step the side panels 71i and 71j are folded inwardly to vertical position along the scored and perforated lines 71b and 71e. In the next step the zone portions 71q are folded along the scored and perforated lines 71q2 and the end panels 71h and 71g are folded to vertical position along the scored and perforated lines 71b and 71c and the folded zone portions pressed thereagainst. The portions of the cover beyond the panels 71i and 71j and beyond the end panels 71o and 71p is then folded inwardly and against the end panels 71o and 71p. This is the position of the box shown in Fig. 20. In the next step the end panels 71o and 71p together with the folded in portions of the cover overlying the same are then folded inwardly and over the panels 71g and 71h and into vertical position at the inner sides of said panels. The box is now in completed condition, as shown in Fig. 21. The corners 70c when folded over panels 71h and 71g and into vertical position against the same extend into the recesses formed by the cut out portions 71m1 and are locked therein. This helps maintain the end parts of the box in vertical position. The inner lines used on the blank 71 are also provided with perforations. There is always a tendency for a folded panel to spring back toward its original position. This is overcome by the perforations and the sides and ends of the completed box easily maintain their vertical positions. As in the previous modifications, it will be understood that the cover 70 is loose and unattached to the outer sides of the box so that the box is in reality a loose wrapped box and also has the appearance of a hand wrapped gift box.

In Figs. 22 to 24 another modification is shown similar to that just previously described. In this structure a box or stiffener blank 80 is shown having center panels 80a and side panels 80b contiguous therewith and of the same length as center panel 80a. Extension panels 80c are disposed at the outer sides of panels 80b and are contiguous with panels 80b and of the same length as said panels. An exterior panel 80d is at the outer side of each extension panel 80c, the same being contiguous therewith and of the same length. Said blank 80 also has end panels 80e contiguous and of the same length as the sides of panel 80a. Panels 80e have extension panels 80f which are contiguous therewith and of the same length. The side and end panels 80b and 80e are joined by gores 80g, the same being contiguous with the ends of said panels respectively. The gores 80g are substantially square except that they have their outer corners cut away on the line 80g1 which is perpendicular to one of the diagonals of said gores. Creases 80a1 are formed at the ends and sides of the central panel 80a. Similar creases 80b1 are formed at the outer sides of the panels 80b. The creases 80a1 extend along the inner sides of the gores 80g. Creases 80e1 are formed at the outer sides of the side panels 80e. Creases 80g1 are also formed on the outwardly extending diagonal of the gores 80g. A cover blank 81 underlies the blank 80 and is of the same shape as blank 80 except that it extends a short distance beyond the side of extension panels 80f as shown at the portions 81a. In Fig. 22 the exterior panel 80d is shown folded over the extension panel 80c as is illustrated in the section in Fig. 23. Also in Fig. 22 one extension panel 80f is shown folded inwardly and overlying the side panel 80e. The extension panels 80f and the portions of the cover lying thereunder, have narrow rectangular portions 80f1 cut away to form recesses at their outer edge portions. The extension panels 80c and the portion of the cover lying thereunder also have narrow rectangular portions cut away at the inner portion of their ends as shown at 80c1 to form narrow recesses.

In manipulating the blanks to form the box the extension side panels 80f are folded inwardly and down on the side panels 80e and secured thereto in any suitable manner, as by stapling or by an adhesive. The cover blank is then folded inwardly over the folded in extension panels 80e and the portions 81a extend along the central panel 80a or the bottom of the box in contact therewith. The exterior panels 81d are folded inwardly over the extension panels 80c, as shown in Fig. 22. The panels 80d may be secured to the panels 80c by a central staple 82, as shown in Fig. 22, or by an adhesive or said panels may remain loose. The gores 80g are now folded inwardly together with the portion of the cover which underlies the same along lines 80g1 and the ends of the cover are now folded inwardly over on the folded in panels 80d and the extension panels 80c then raised and folded inwardly over the folded in gores 80g and the end panels 80b which have now been raised to vertical position. The ends of the folded in portions 80d and 80c with the end of the cover folded over on portion 80d can now extend into the recesses 80f1. This is assisted by the cut away portions 80c1.

A very efficient box is now formed, a portion of which is shown in Fig. 24. The box will form one-half of a bipartite box, the other half which will be identical. The bottom or top of the box is loose wrapped with the cover as will the sides thereof. The box thus has all the appearance of a hand wrapped gift box. The box can be very rapidly made and very rapidly folded into final condition by the salesman. In ordinary practice the salesmen will fold several of the boxes from the supply of the blanks while they are not particularly busy so that the boxes will be readily available when sales are made.

From the above description it will be seen that I have invented a very novel, efficient and highly useful box for small merchandise which is particularly suitable for and valuable at Christmas time and other special holidays. The matter of having boxes hand wrapped at Christmas time and other special occasions has been very troublesome for store owners. The present box solves a very difficult problem and will greatly reduce the expense of stores which must use such boxes. The box has been amply demonstrated in actual practice, found to be very successful and efficient and a commercial production of the same is under way.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claims.

What I claim is:

1. An article of merchandise comprising members adapted to be folded to form one part of a bipartite telescoping box having in combination, a blank of rather stiff sheet material, a loose cover of lighter sheet material therefor, said blank comprising a rectangular main body panel having end panels disposed at opposite ends thereof, score lines at the junction of said body panels and end panels, said body panel having side panels disposed at opposite sides thereof, score lines at the junction of said body panel and side panels, a pair of gores joining each end of said end panels to the end of adjacent side panels and disposed between the ends of said side and end panels, said gores having incisions therein extending from the corners of said main body panel outwardly to substantially the center of said gores and creases extending from said incisions outwardly to the outer edge of said gores, said end panels having extension panels contiguous therewith, said cover overlying said blank and having a central body panel coextensive with said body panel of said blank and having end panels and extension panels coincident with the end panels, gores and extension panels of said blank, said cover having side panels of the same length as the side panels of said blank and extending a short distance beyond said latter side panels, the extension panels of said blank and cover having their adjacent surfaces secured together, said extension panels of said blank having areas of adhesive thereon at the side opposite said cover and disposed adjacent the center of said side panels, said gores on said blank having adhesive on substantially half the surface thereof extending from said incisions and creases to the outer edges of said gores and to the ends of said end panels, said projecting portions of said cover side panels being bent over the side panels of said blank and secured thereto by said adhesive, said side panels of said member and cover being bent over the central portion of said blank and the end panels thereon, the portions of said gores with said adhesive thereon being secured by said adhesive to said end panels, said extension panels being bent over the end panels of said blank and secured to the end panels of said blank by said adhesive at the central portions of said extension panels, thus leaving the end portions of said extension panels free, whereby a collapsed container is formed the sides and the ends of which can be lifted to form a rectangular box.

2. The structure set forth in claim 1 said folded over sides and end portions being lifted up and the free end portions of said extension panels being disposed at the outer sides of the unsecured portions of said gores which are without adhesive, whereby a quite rigid rectangular box is formed with the sides and ends firmly supported in upright position.

3. The structure set forth in claim 1 said incisions forming a somewhat smaller angle with the ends of said side panels than with the ends of said end panels respectively.

References Cited in the file of this patent

UNITED STATES PATENTS

| | | |
|---|---|---|
| Re. 21,706 | Claff | Feb. 4, 1941 |
| 987,280 | Bachmann | Mar. 21, 1911 |
| 1,365,351 | Smith | Jan. 11, 1921 |
| 1,833,492 | Miller | Nov. 24, 1931 |
| 1,923,065 | Clemens | Aug. 22, 1933 |
| 2,214,813 | Guyer | Sept. 17, 1940 |
| 2,294,690 | Perry | Sept. 1, 1942 |
| 2,414,854 | Conescu | Jan. 28, 1947 |
| 2,479,456 | Arthur | Aug. 16, 1949 |
| 2,697,546 | Bergstein | Dec. 21, 1954 |